Feb. 26, 1957 E. P. NEY ET AL 2,783,002
AUTOMATIC BALLOON APPENDIX
Filed Nov. 30, 1954 2 Sheets-Sheet 1

INVENTORS:
EDWARD P. NEY
JOHN R. WINCKLER
BY
ATT'YS

Feb. 26, 1957 E. P. NEY ET AL 2,783,002
AUTOMATIC BALLOON APPENDIX
Filed Nov. 30, 1954 2 Sheets-Sheet 2

COEFFICIENT OF FRICTION AS A FUNCTION OF ANGLE FOR VARIOUS RATIOS OF RING WEIGHT TO TAPE TENSION.

INVENTORS:
EDWARD P. NEY
JOHN R. WINCKLER
BY
ATT'YS

United States Patent Office 2,783,002
Patented Feb. 26, 1957

2,783,002

AUTOMATIC BALLOON APPENDIX

Edward P. Ney, Minneapolis, and John R. Winckler, St. Paul, Minn., assignors, by mesne assignments, to the United States of America as represented by the Secretary of the Navy Application November 30, 1954, Serial No. 472,264

7 Claims. (Cl. 244—31)

This invention relates in general to a plastic balloon comprising a spherical upper portion and a gathered lower end where a load is supported in the ordinary manner. A slidable ring is applied to the outside of the lower portion of the balloon and allows the balloon to inflate as it rises and maintains an approximately constant shape as it ascends using the extra material as a dangling appendix.

An important object of the invention is to provide an automatic appendix which allows a balloon to inflate as it rises and to maintain an approximately constant shape.

A further object of the invention is to provide a slidable ring in connection with the lower portion of a balloon which minimizes the intake of air on ascent and provides a dangling appendix which minimizes balloon failure in turbulent portions of the atmosphere.

A still further object of the invention is to provide a slidable ring having predetermined frictional resistance with the material of the balloon, such that a controlled automatic slippage is provided during the ascent of the balloon.

Other objects of the invention will appear in the specification and will be apparent from the drawings in which.

In applying a sliding ring to form an automatic balloon appendix, it is important that the ring is of a proper size to receive the material of the balloon therein, that it is of a certain weight in comparison with the tension or weight on the load tapes, and that it is of a material which has a definite coefficient of friction with respect to the balloon material.

Figure 9:
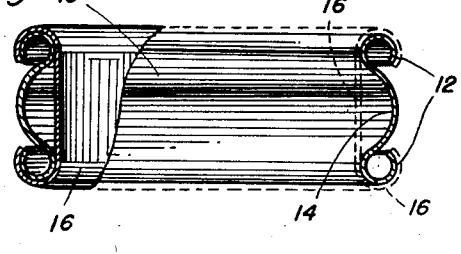
Fig. 9 is a sectional view of a preferred form of slidable ring having a material coating the inner contact surface of the ring.

Referring now more particularly to the drawings, a preferred form of the slidable ring 10 is shown in Fig. 9 which may be of fiber, light-weight metal, such as aluminum, or any other suitable material. This ring is of a predetermined diameter to receive the folds of the lower end of a balloon tightly therein; and if formed of light-weight metal, the ring is in the form of a collar having outwardly curled beads of edges 12 and a concave intermediate portion 14 which bulges outwardly between the curled edges thereof. To the inside of this ring is applied a sleeve 16 of frictional material which may be the same material as that of which the balloon is constructed or other frictional material.

In preparing the balloon for flight, a ring 10 is applied over the lower or base end of a balloon 18, and thereafter load tapes 20 at the bottom of the balloon may be connected to a load 22 in a conventional manner. The ring is slipped upwardly upon and about the lower edge of the balloon to a point which is determined by the desired altitude of the balloon, the gas which is used in the balloon, and the weight of the load which is to be carried.

The balloon is inflated with the predetermined amount of gas which partially fills the upper or spherical end of the balloon at the ground level, and the balloon expands as it rises due to the decrease in atmospheric pressure.

Figure 1:
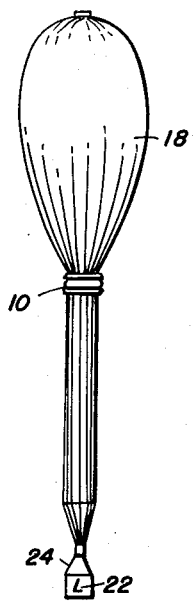
Figs. 1 to 5 illustrate various successive steps of a balloon equipped with an automatic appendix in accordance with this invention.
Figure 2:
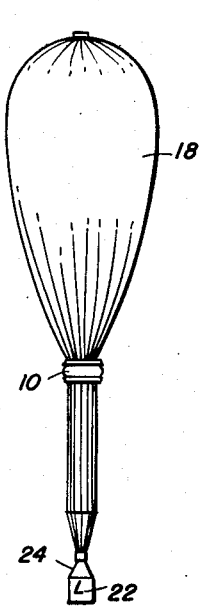
Figure 3:
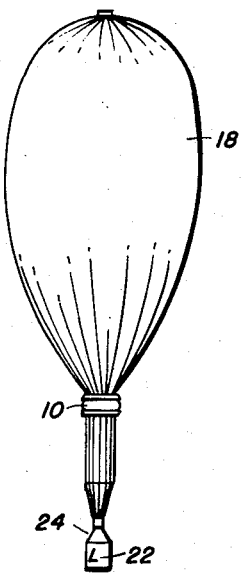
Figure 4:
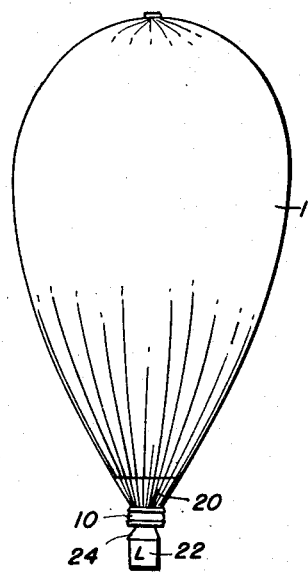
Figure 5:
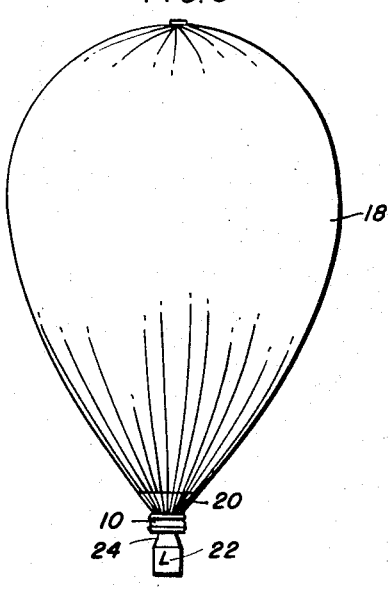

When the balloon is at low altitude, the ring will be relatively high on the balloon confining the gas to the upper portion thereof as shown in Fig. 1. As the balloon rises to higher altitudes, as represented by Figs. 2 and 3, the ring moves slowly downward under the continued pressure of the gradually increasing volume of expanded gas in the balloon. As shown in Fig. 4, the ring has fallen entirely off from the balloon and is carried upon supports 24 for the load 22. In Fig. 5, the balloon is completely filled up by the gas and is at the ceiling altitude.

Although the movement of the friction ring is thus represented in stages, it is to be understood that this movement may be continuous, gradual, or intermittent, depending upon the flight conditions, the rate of rise of the balloon, and the actual frictional conditions.

Figure 7:
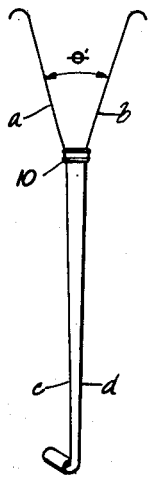
Figs 6 and 7 are diagrammatic views which illustrate the method of analyzing the problem of slippage of the slidable ring upon the material of the balloon.
Figure 6:
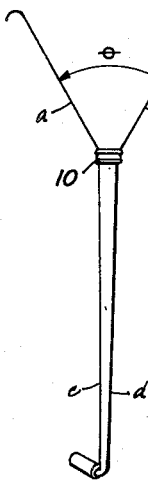

In determining the relative relations and solutions for various values of the weight of the ring to the tension in the load tapes 20 depending upon the angle of the balloon sides above the ring, reference is made to Figs. 6 and 7 in which the lines $a$ and $b$ represent the inclination of the sides of the balloon at an angle $\theta$ above the ring 10, and portions $c$ and $d$ represent the sides of the appendix below the ring supporting a load 22 at the bottom. The angle $\theta$ may vary from a position as shown in Fig. 6 which is sufficient to cause the ring to slip upon the lower portion of the balloon to some other angle, as $\theta'$ as shown in Fig. 7 at which it does not slip. In rising, the sides of the balloon are at a smaller inclination, and as it expands to the angle $\theta$, the friction between the ring and the balloon is overcome, and the ring is pressed downwardly to some other stage or to some other position depending upon the weight of the ring relative to the tension in the tapes.

Thus, the ring acts as a clamp during the inflation of the balloon top, and the ring is moved or released by the inflation of the top at various altitudes. In one flight, for example, the ring was released from the balloon at an altitude of about 12,000 feet. At this time, the ring fell onto the load supports 24 at the bottom of the balloon.

Upon first consideration, it might seem that the ring would immediately slip down to the bottom of the balloon. In setting up the problem, however, it is found that the ring may or may not slip depending upon the weight of the ring relative to the tension in the supporting balloon tapes and the divergent sides of the balloon above the ring. For a given ratio of ring weight to tape tension, the angle $\theta$ at which the ring slips depends upon the coefficient of friction between the ring and the balloon. The physics of the problem is illustrated in Figs. 6 and 7. With the smaller angle between the sides $a$ and $b$ as shown in Fig. 7, the ring is stable, and with the angle $\theta$ as shown in Fig. 6, the angle is just large enough to cause the ring to commence its downward slide. Analysis and the development of the problem lead to the following:

$$\mu = \frac{\left(\dfrac{1+\dfrac{W}{L}}{\cos\theta}-1\right)}{\dfrac{1}{2}\log\left(\dfrac{1+\sin\theta}{1-\sin\theta}\right)+\dfrac{1}{2}\dfrac{W}{L}\left(\theta^2+\dfrac{\theta^4}{4}+\cdots\right)}$$

An approximate solution of this equation is:

$$\mu = \frac{\left(\dfrac{1+\dfrac{W}{L}}{\cos\theta}-1\right)}{\dfrac{1}{2}\log\left(\dfrac{1+\sin\theta}{1-\sin\theta}\right)}$$

where
$\mu$ = coefficient of friction
W = weight of ring
L = tension in load lines
$\theta$ = cone angle at which slipping takes place.

Figure 8:
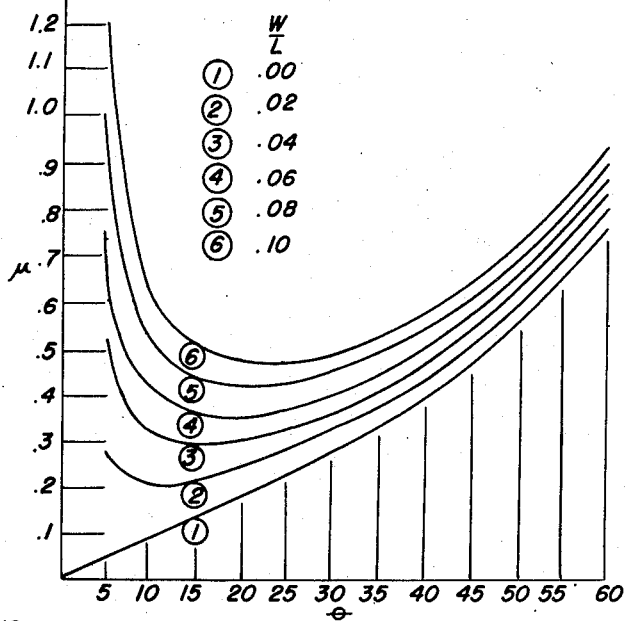
Fig. 8 is a chart illustrating the coefficient of friction as a function of the angle of the balloon sides for various ratios of ring weight to tape tension.

The chart of Fig. 8 shows a solution to the above equation for various values of $$\frac{W}{L}$$

For a polyethylene balloon sliding upon a polyethylene surface sleeve 16 in the ring 10, the coefficient of friction is about 0.2, and the angle at which slipping takes place is about 170°. This was demonstrated in actual practice where it was noticed that the balloon became nearly spherical above the ring before actual slipping took place.

In later flights, a nylon taped, wrapped ring was used for which the coefficient of friction was about 0.25. The range of loads actually flown in practice was between curves 2 and 3 on the chart. With heavy loads as in curve 2, it was sometimes observed that the sliding ring moved down in steps as expected. This ring should come down in steps because as soon as $\theta$ becomes large enough to cause the ring to slip against static friction, the ring will start down and descend until $\theta$ has decreased enough to just hold against sliding friction. It is noted that the coefficient of sliding friction is less than the coefficient of static friction. With light loads, as in curve 3, the ring was observed to come down in one step.

As an illustration, if it is assumed that the ring weighs 2% of the tension in the balloon tapes and that it has a coefficient of static friction of 0.3 and a coefficient of sliding friction of 0.25, it will commence to slip when $\theta$ becomes as large as 26° and will stop when $\theta$ has decreased to 19°. These values may be checked on curve 2 of the chart.

With this construction and operation the automatic functioning of the appendix will maintain a desirable aerodynamic shape in the balloon during the ascent which will thereby minimize balloon failures in turbulent portions of the atmosphere or in a jet stream. It will also be observed with reference to Figs. 1 to 5 that a balloon with a step-by-step appendix of this kind according to this invention tends to maintain an approximately constant shape of the balloon as it ascends using the extra material below the sliding ring as a dangling appendix.

While a preferred embodiment has been described in some detail, it should be regarded as an example or embodiment of the invention and not as a restriction or limitation therein as many changes may be made in the construction and arrangement of the parts without departing from the spirit and scope of the invention.

We claim:

1. The combination of a balloon having a spherical top portion, a tapering base portion, and peripheral load lines, and a confining slidable ring about the base portion and load lines, said ring and base portion having a mutual coefficient of sliding friction of from about 0.20 to about 0.50, the friction therebetween being sufficient to maintain the ring in raised position on the partially inflated balloon until the balloon is fully expanded, said load lines being tensioned through the ring by the balloon in flight, the position of the ring depending on the relative values of the weight of the ring and the tension in the load lines.

2. The combination of a balloon having a spherical top portion, a tapering base portion, and peripheral load lines, and a confining slidable ring about the base portion and load lines, the base portion and the ring having polyethylene interengaging surfaces having a mutual coefficient of sliding friction of about 0.20, the friction therebetween being sufficient to maintain the ring in raised position on the partially inflated balloon until the balloon is fully expanded, said load lines being tensioned through the ring by the balloon in flight, the position of the ring depending on the relative values of the weight of the ring and the tension in the loading lines, the angle of the balloon portion above and contiguous with the ring relative to the portion below the ring being about 170° when slipping of the ring commences.

3. The combination of a balloon having a spherical top portion, a tapering base portion, and peripheral load lines, and a confining slidable ring about the base portion and load lines, the base portion and the ring having polyethylene interengaging surfaces having a mutual coefficient of static friction of about 0.3 and a coefficient of sliding friction of about 0.25, the friction therebetween being sufficient to maintain the ring in raised position on the partially inflated balloon until the balloon is fully expanded, said load lines being tensioned through the ring by the balloon in flight, the position of the ring depending on the relative values of weight of the ring and the tension in the load lines, the cone angle of the inflated balloon portion above and contiguous to the ring being about 26° when the ring commences to slip.

4. The combination of a balloon having a spherical top portion, a tapering base portion, peripheral load lines, and a confining slidable ring about the base portion and load lines, the base portion and ring having polyethylene interengaging surfaces having a mutual coefficient of static friction of about 0.3 and a coefficient of sliding friction of about 0.25, the friction therebetween being sufficient to maintain the ring in raised position on the partially inflated balloon until the balloon is fully expanded, said load lines being tensioned through the ring by the balloon in flight, the position of the ring depending on the relative values of weight of the ring and the tension in the load lines, the cone angle of the inflated balloon portion above and contiguous to the ring being about 26° when the ring commences to slip, the ring stopping its sliding movement when the cone angle decreases to about 19°.

5. A method of launching a balloon which, when fully expanded, has a tear-drop shape, comprising the steps of temporarily constricting an intermediate part of the balloon, partially inflating the portion of the balloon above the constriction, so that the lower portion of the balloon constitutes an appendix, and automatically lowering the place of constriction with ascent of the balloon.

6. A method of launching a balloon, comprising the steps of constricting an intermediate part of the balloon, inflating the portion of the balloon above the constriction, and automatically lowering the constriction step by step along the lower portion of the balloon pursuant to ascent of the balloon.

7. A method of launching a balloon, comprising the steps of inflating the upper portion of the balloon, gathering the appendix, temporarily confining the appendix at the juncture of the appendix with the upper portion of the balloon, and using the expanding cone angle of the balloon directly above the place of confinement, as the balloon ascends, to lower the place of confinement.

References Cited in the file of this patent

UNITED STATES PATENTS

| | | |
|---|---|---|
| 1,771,261 | Lendner | July 22, 1930 |
| 2,525,798 | Hattan | Oct. 17, 1950 |
| 2,566,585 | Smith | Sept. 4, 1951 |
| 2,635,834 | Huch | Apr. 21, 1953 |

FOREIGN PATENTS

| | | |
|---|---|---|
| 137,429 | Great Britain | Jan. 15, 1920 |